(12) United States Patent
Simmons et al.

(10) Patent No.: US 7,774,975 B2
(45) Date of Patent: Aug. 17, 2010

(54) FISHING LURE WITH IRIDESCENT MEMBERS

(76) Inventors: David Simmons, 1211 Douglass La., Sevierville, TN (US) 37876; Dewell Walker, P.O. Box 1431, Buras, LA (US) 70041

( * ) Notice: Subject to any disclaimer, the term of this patent is extended or adjusted under 35 U.S.C. 154(b) by 295 days.

(21) Appl. No.: 11/846,599

(22) Filed: Aug. 29, 2007

(65) Prior Publication Data

US 2009/0056195 A1    Mar. 5, 2009

(51) Int. Cl.
*A01K 85/00*    (2006.01)
*A01K 85/08*    (2006.01)

(52) U.S. Cl. .................. 43/42.28; 43/42.24; 43/42.32; 43/42.33; 43/42.25

(58) Field of Classification Search ........... 43/42.28, 43/42.24, 42.32, 42.33, 42.34, 42.25, 42.26, 43/42.27
See application file for complete search history.

(56) References Cited

U.S. PATENT DOCUMENTS

| | | | | |
|---|---|---|---|---|
| 1,323,458 A * | 12/1919 | Dills | ............................ | 43/42.33 |
| 1,569,993 A * | 1/1926 | Macleod | ...................... | 43/42.26 |
| 1,611,117 A * | 12/1926 | Kearns | ....................... | 43/42.26 |
| 1,612,264 A * | 12/1926 | Cressey | ...................... | 43/42.33 |
| 1,639,863 A * | 8/1927 | Sinclair et al. | .............. | 43/42.32 |
| 1,849,899 A * | 3/1932 | Wright et al. | ............... | 43/42.25 |
| 1,921,176 A * | 8/1933 | Unkefer | ....................... | 43/42.33 |
| 2,111,020 A * | 3/1938 | Arbogast | .................... | 43/42.28 |
| 2,114,342 A * | 4/1938 | Gardner | ...................... | 43/42.25 |
| D110,648 S * | 7/1938 | Powell | ........................ | 43/42.28 |
| 2,134,401 A * | 10/1938 | Harvey | ........................ | 43/42.28 |
| 2,168,894 A * | 8/1939 | Arbogast | .................... | 43/42.28 |
| 2,309,521 A * | 1/1943 | Mabee | ......................... | 43/42.33 |
| 2,309,902 A * | 2/1943 | Harvey | ........................ | 43/42.28 |
| 2,350,572 A * | 6/1944 | Schweigert | ................. | 43/42.33 |
| 2,423,431 A * | 7/1947 | Allen | ........................... | 43/42.25 |
| 2,503,672 A * | 4/1950 | Johnson et al. | ............. | 43/42.28 |
| 2,583,942 A * | 1/1952 | Harvey | ........................ | 43/42.33 |
| 2,657,495 A * | 11/1953 | Eppinger | .................... | 43/42.33 |
| 2,686,382 A * | 8/1954 | Fisher | ......................... | 43/42.28 |
| 2,741,058 A * | 4/1956 | Allman et al. | .............. | 43/42.24 |
| 2,753,651 A * | 7/1956 | Fisher | ......................... | 43/42.06 |
| 2,909,863 A * | 10/1959 | Rector et al. | ................ | 43/42.33 |
| 2,933,847 A * | 4/1960 | Frasure | ....................... | 43/42.33 |
| 3,060,620 A * | 10/1962 | Binkowski | .................. | 43/42.28 |

(Continued)

FOREIGN PATENT DOCUMENTS

GB    2268673 A  *  1/1994

(Continued)

*Primary Examiner*—Darren W Ark
(74) *Attorney, Agent, or Firm*—Knox Patents; Thomas A. Kulaga

(57) ABSTRACT

An apparatus for attracting fish including at least one iridescent member forming an iridescent tail extending from the shank of a fish hook. The iridescent tail includes one or more layers of a translucent film. The layers have an elongated shape with a longitudinal fold. The forward end of the layers is folded over the shank of the hook and secured to the hook. In various embodiments, the iridescent tail includes one or more colored translucent layers, trailing ribbons, and/or a worm-shaped member. The outboard end of the iridescent tail is configured to be pointed or have a V-shape. In another embodiment, the layers have one or more slits parallel to the longitudinal fold.

20 Claims, 4 Drawing Sheets

U.S. PATENT DOCUMENTS

| | | | | |
|---|---|---|---|---|
| 3,122,853 A * | 3/1964 | Koonz et al. | | 43/42.33 |
| 3,245,171 A * | 4/1966 | Henry | | 43/42.33 |
| 3,367,060 A * | 2/1968 | Abercrombie | | 43/42.33 |
| 3,528,189 A * | 9/1970 | Lilley, Jr. | | 43/42.33 |
| 3,540,144 A * | 11/1970 | Gurka | | 43/42.33 |
| 3,568,354 A * | 3/1971 | Yacko | | 43/17.6 |
| 3,590,514 A * | 7/1971 | Begley | | 43/42.28 |
| 3,631,625 A * | 1/1972 | Castner | | 43/42.33 |
| 3,724,117 A * | 4/1973 | Flanagan, Jr. | | 43/42.32 |
| 3,769,738 A * | 11/1973 | Begley | | 43/42.26 |
| 3,803,747 A * | 4/1974 | Cartwright | | 43/42.28 |
| 3,855,722 A * | 12/1974 | Moore | | 43/42.28 |
| 3,883,979 A * | 5/1975 | Williams, Jr. | | 43/42.28 |
| 3,914,895 A * | 10/1975 | Mize | | 43/42.28 |
| 3,959,912 A * | 6/1976 | Lee | | 43/42.28 |
| 4,033,063 A * | 7/1977 | Mize | | 43/42.28 |
| 4,074,454 A * | 2/1978 | Cordell, Jr. | | 43/42.28 |
| 4,199,888 A * | 4/1980 | Barnes | | 43/42.33 |
| 4,215,506 A * | 8/1980 | LeBoeuf | | 43/42.33 |
| 4,236,342 A * | 12/1980 | Saia | | 43/17.6 |
| 4,307,531 A * | 12/1981 | Honse | | 43/42.32 |
| 4,335,495 A * | 6/1982 | Buchanan | | 43/42.53 |
| 4,429,482 A * | 2/1984 | Honse | | 43/42.33 |
| 4,619,067 A * | 10/1986 | West | | 43/42.28 |
| 4,638,586 A * | 1/1987 | Hall | | 43/42.28 |
| 4,712,325 A * | 12/1987 | Smith | | 43/42.28 |
| 4,741,120 A * | 5/1988 | Cota et al. | | 43/42.33 |
| 4,790,100 A * | 12/1988 | Green, Sr. | | 43/42.28 |
| 4,862,631 A * | 9/1989 | Wilson et al. | | 43/42.33 |
| 4,908,975 A * | 3/1990 | Root et al. | | 43/42.28 |
| 4,922,646 A * | 5/1990 | Basgal | | 43/42.33 |
| 5,016,387 A * | 5/1991 | Beaupre | | 43/42.33 |
| 5,125,182 A * | 6/1992 | Holder | | 43/42.36 |
| 5,195,269 A * | 3/1993 | Black et al. | | 43/42.33 |
| 5,207,016 A * | 5/1993 | Pate | | 43/42.28 |
| 5,209,008 A * | 5/1993 | Kasznica | | 43/42.27 |
| 5,251,395 A * | 10/1993 | Wicklund | | 43/42.25 |
| 5,361,531 A * | 11/1994 | Rodrigues | | 43/42.28 |
| 5,628,140 A * | 5/1997 | Hnizdor | | 43/42.25 |
| 5,667,739 A * | 9/1997 | Kato | | 264/50 |
| 5,862,623 A * | 1/1999 | MacPherson | | 43/42.24 |
| 5,950,345 A * | 9/1999 | Kilander | | 43/42.32 |
| 5,960,580 A * | 10/1999 | Link | | 43/42.53 |
| 6,003,264 A * | 12/1999 | Hnizdor | | 43/42.33 |
| 6,009,658 A * | 1/2000 | Firmin | | 43/42.28 |
| 6,018,902 A * | 2/2000 | Gudermuth et al. | | 43/42.33 |
| 6,182,391 B1 * | 2/2001 | Hubbard | | 43/42.33 |
| 6,192,616 B1 * | 2/2001 | Kent | | 43/42.33 |
| 6,205,697 B1 * | 3/2001 | Kent | | 43/42.53 |
| 6,301,823 B1 * | 10/2001 | Monticello et al. | | 43/42.33 |
| 6,393,757 B2 * | 5/2002 | Bomann | | 43/42.24 |
| 6,418,659 B1 * | 7/2002 | Shelton | | 43/42.28 |
| 6,564,499 B1 * | 5/2003 | Firmin | | 43/42.26 |
| 6,912,808 B1 * | 7/2005 | Mak | | 43/42.33 |
| 6,962,641 B2 * | 11/2005 | Chocklett et al. | | 43/42.33 |
| 7,322,150 B1 * | 1/2008 | Kent | | 43/42.28 |
| 2002/0157300 A1* | 10/2002 | Saul | | 43/42.33 |
| 2006/0042150 A1* | 3/2006 | Roh | | 43/42.32 |
| 2006/0123689 A1* | 6/2006 | Lange | | 43/42.32 |
| 2008/0115403 A1* | 5/2008 | Shelton et al. | | 43/42.24 |
| 2009/0000177 A1* | 1/2009 | Johnson et al. | | 43/42.32 |
| 2009/0056196 A1* | 3/2009 | Korteweg | | 43/42.28 |

FOREIGN PATENT DOCUMENTS

| | | | |
|---|---|---|---|
| GB | 2335129 A * | | 9/1999 |
| JP | 04066037 A * | | 3/1992 |
| JP | 04211316 A * | | 8/1992 |
| JP | 05007441 A * | | 1/1993 |
| JP | 05137479 A * | | 6/1993 |
| JP | 05336863 A * | | 12/1993 |
| JP | 06253709 A * | | 9/1994 |
| JP | 08066138 A * | | 3/1996 |
| JP | 08126450 A * | | 5/1996 |
| JP | 10127210 A * | | 5/1998 |
| JP | 11276023 A * | | 10/1999 |
| JP | 2000125701 A * | | 5/2000 |
| JP | 2000209981 A * | | 8/2000 |
| JP | 2000217467 A * | | 8/2000 |
| JP | 2002325525 A * | | 11/2002 |
| JP | 2003274799 A * | | 9/2003 |
| JP | 2006141285 A * | | 6/2006 |

* cited by examiner

FISHING LURE WITH IRIDESCENT MEMBERS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to fishing lures. More particularly, this invention pertains to devices that attract fish for catching those fish.

2. Description of the Related Art

Fishing is both a sport and a livelihood for many. To catch fish with a hook, the fish must be enticed to strike the hook such that the barb of the hook impales the flesh of the fish. To entice fish, hooks often hold bait or are integrated or attached to a lure, which is an object that resembles fish prey.

Known fishing lures have a variety of shapes and configurations. In general, these shapes and configurations are intended to attract and entice fish to strike the lure. In many cases, lures are designed to imitate the prey of the fish attempted to be caught. Such prey includes a vulnerable fish, a worm, or an insect Generally, lures attract fish by the appearance of the lure and/or the movement of the lure through or on the water. With respect to appearance, the shape, configuration, color, and reflectance, among other attributes may attract a specific species of fish. With respect to movement, some lures float like a bug on the surface of the water, other lures move vertically like prey, and still others wiggle in the water as they move horizontally, which mimics the movement of a fish.

BRIEF SUMMARY OF THE INVENTION

According to one embodiment of the present invention, an apparatus for attracting fish is provided. An iridescent tail incorporated in a fishing lure attracts fish by presenting multiple and varying colors when in the water. The iridescent tail is configured to attach to a fish hook, a jig, or other type of lure body to aid in attracting fish for capture. The iridescent tail is configured to be attached axially and extending away from a lead line.

The iridescent tail is fabricated of at least one layer of iridescent film, which is a transparent or translucent optical effect film in which the perceived color changes depending on the viewing angle. In one embodiment, the iridescent tail includes an outermost layer and an innermost layer of iridescent film with a translucent colored layer in the middle. The layers have a longitudinal fold with the shank of a hook nestled in one end of the layers and the layers folded over and secured to the shank. The opposite end of the layers have a pointed shape, and in another embodiment, the layers have a V-shaped end. The length of the layers progressively varies with the shortest and the longest layers on the outside and inside, respectively. In one embodiment, one or more of the layers have slits that are parallel to the longitudinal fold.

In other embodiments, the iridescent tail includes filaments that trail from the forward end of the iridescent tail. In one such embodiment, the iridescent tail includes at least one layer of iridescent film and a plurality of ribbons connected at the shank of a hook. In various such embodiments, the ribbons are wide, narrow, or a combination of widths. In other such embodiments the ribbons are iridescent film, colored film, or a combination of the two. In still another embodiment, the iridescent film is crumpled with multiple, random folds and creases over its surface. In such an embodiment, the crumpled film is positioned between two layers of translucent film or positioned adjacent a single layer of translucent film.

In another embodiment, the iridescent tail includes a worm-shaped member that is attached to the shank of a hook adjacent the at least one layer of iridescent film. The worm-shaped member is flexible such that it appears to move relative to the rest of the iridescent tail when the lure is in the water. In still another embodiment, a glass bead is positioned around the shank of the hook and the glass bead is positioned forward of the iridescent tail.

In yet another embodiment of the lure, a fin is attached adjacent the head of the iridescent tail. The fin is a stiff or rigid member that extends downward from the lure and causes the lure to follow an erratic path when the lure is pulled through the water. The fin assembly is attached to the lure adjacent the iridescent tail attachment to the lure.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for attracting fish is disclosed. A fishing lure, generally referred to as item 102, includes an iridescent tail, generally referred to as item 100.

Figure 1:
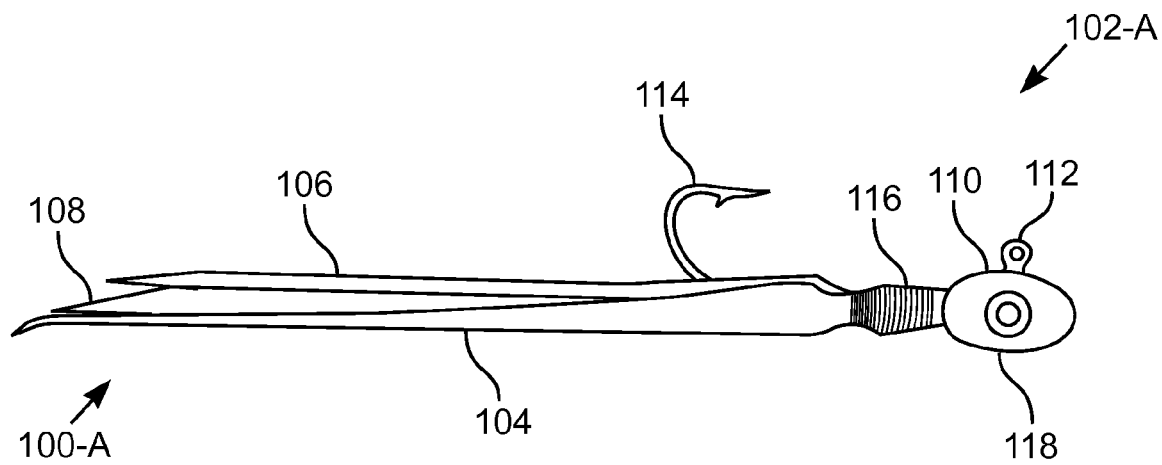
FIG. 1 is a side view of one embodiment of a lure with one embodiment of an iridescent tail.
Figure 2:
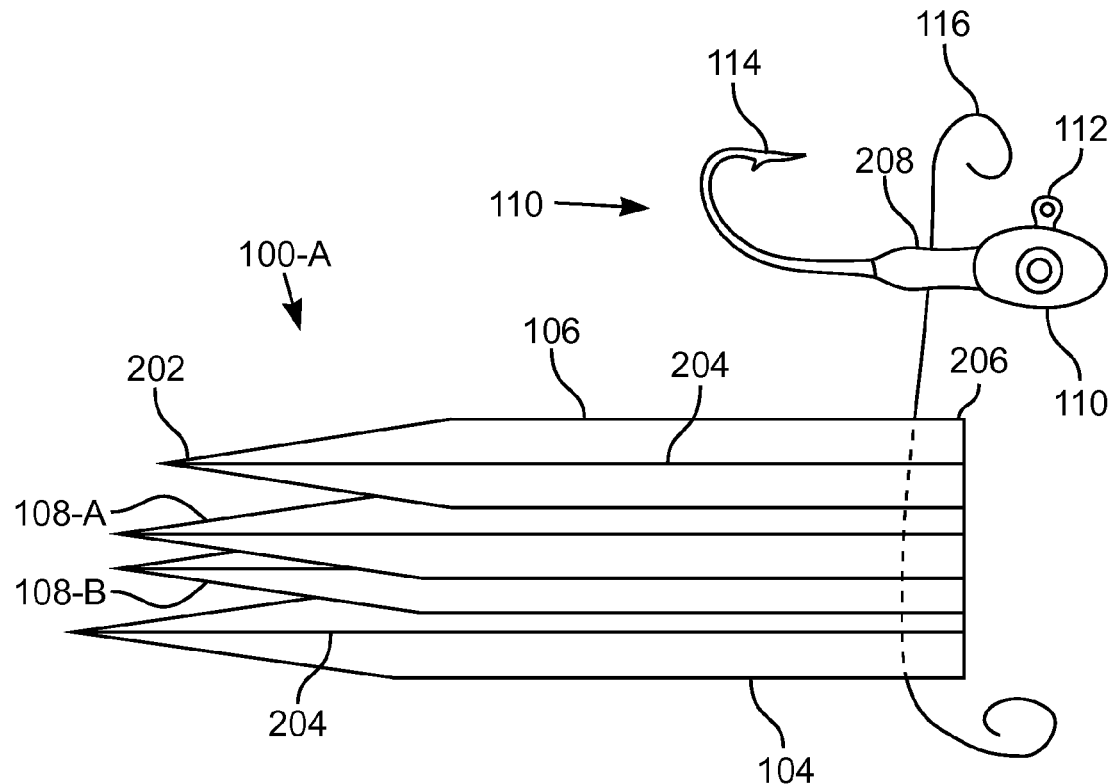
FIG. 2 is a plan view of one embodiment of a lure with the various components spread out in an unassembled configuration.

FIG. 1 illustrates a side view of one embodiment of a lure 102-A with one embodiment of an iridescent tail 100-A. FIG. 2 illustrates a plan view of the lure 102-A with the various components spread out, thereby showing the construction of the lure 102-A. The illustrated lure 102-A includes a jig 110 that has a head 118 with a eye 112 and a hook 114. The head 118 of the jig 110 is a lead sinker with the hook 114 molded into the head 118. A portion of the shank of the hook 114 is surrounded by the shank 208 of the jig 110. The eye 112 provides an attachment point for connecting a fish line to the lure 102-A. In the illustrated embodiment, the jig 110 resembles the head of a small fish. In another embodiment, the head 118 is replaced with a glass bead and the eye 112 is the eye of the hook that extends through the glass bead. In such an embodiment, the glass bead includes a through-opening that receives the shank 208 of the hook 114. The glass bead, in various embodiments, includes materials that reflect light in various patterns and/or includes phosphorescent material that cause the bead to glow when in the water.

The iridescent tail 100-A includes multiple layers 104, 106, 108 of sheets of material that have a longitudinal fold 204. The layers 104, 106, 108 are oblong, with the outboard end 202 having a point and the inboard end 206, which attaches to the shank 208 of the jig 110, being substantially square-cut. The layers 104, 106, 108 have a V-shape with the fold 204 forming the apex of the V-shape. In the assembled configuration of the lure 102-A illustrated in FIG. 1, the outboard end 202 of the layers 104, 106, 108 are separated to form a full shape.

The layers 104, 106, 108 have a progressively shorter length from the outermost layer 104 to the innermost layer 106. The lure 102-A is assembled by stacking the layers 104, 106, 108 and placing the shank 208 of the jig 110 adjacent the fold 204 in the innermost layer 106. A section of line 116 is then wrapped around the layers 104, 106, 108, thereby securing the layers 104, 106, 108 to the shank 208.

In another embodiment, the middle layer 108 does not have a center fold 204 or the center fold 204 extends only a short distance from the inboard end 206. In such an embodiment, the outer layer 104 is forced apart or away from the inner layer 106 proximate the outboard end 202.

The outermost layer 104 of the iridescent tail 100-A is an iridescent film, or sheet. In one embodiment, the innermost layer 106 is also an iridescent film, or sheet and each of the middle layers 108-A, 108-B is a transparent or translucent colored film, or sheet. In various embodiments, each layer 104, 106, 108 is formed of one or more individual sheets. The layers 104, 106, 108 are sufficiently rigid to hold the fold 204 formed in the layers 104, 106, 108.

In various embodiments, the layers 104, 106, 108 have a thickness ranging from approximately 1 to 5 mils, with the layers 104, 106, 108 having a stiffness sufficient for the iridescent tail 100-A to maintain its shape and configuration when attached to the jig 110 as illustrated in FIG. 1.

Iridescent film is a transparent or translucent optical effect film in which the perceived color changes depending on the viewing angle. In one embodiment of iridescent film, multiple, ultra-thin polymer layers alter the path of visible light so that specific wavelengths are reflected while permitting the remainder of the light to be transmitted through the layers. By positioning a colored sheet 108 adjacent an iridescent sheet 104, 106, the iridescent tail 100, when submersed in water, has a multicolored presentation dominated by the color of the colored sheet 108. For example, with the middle layer 108 being yellow, the iridescent tail 100 assumes a predominately yellow color that also appears to be every other color of the rainbow, depending upon the position of the observer. In other embodiments, the middle layer 108 is omitted or is another sheet of iridescent film. In such embodiments, the iridescent tail 100 is more translucent as the tail 100 presents a multitude of colors.

The configuration of the iridescent tail 100, joined at the inboard end 206 and separated slightly at the tail or outboard end 202, aids in attracting fish. The slight separation of the layers 104, 106, 108 traps air when the lure 102 is submerged in water, causing the lure 102 to be unstable. The instability and the varying lengths of the layers 104, 106, 108 aid in causing the lure 102 to move erratically in the water. As the lure 102 moves erratically through the water, the iridescent tail 100 reflects light that is multicolored and continuously changing in color. The erratic movement of the lure 102, in addition to the color display, attracts fish.

In one embodiment, one or more of the iridescent sheets 104, 106, 108 is crumpled, that is, the sheet 104, 106, 108 is crushed such as to form irregular folds and/or wrinkles, and then returned to its elongated, folded shape. In another embodiment, the sheet 104, 106, 108 is textured so as to present a surface that is not flat, but is covered with raised features. The irregular folds and wrinkles result in the sheet 104, 106, 108 having a multitude of almost parallel sections of sheet, with each section having a different color because the sheet sections are not exactly parallel. In such an embodiment, the iridescent tail 100 presents a multitude of colors, simultaneously. In another such embodiment, the middle sheet 108 is a thin sheet that is crumpled and then straightened. The middle sheet 108 is positioned between two translucent sheets 104, 106 that support the thinner middle sheet 108.

Figure 3:
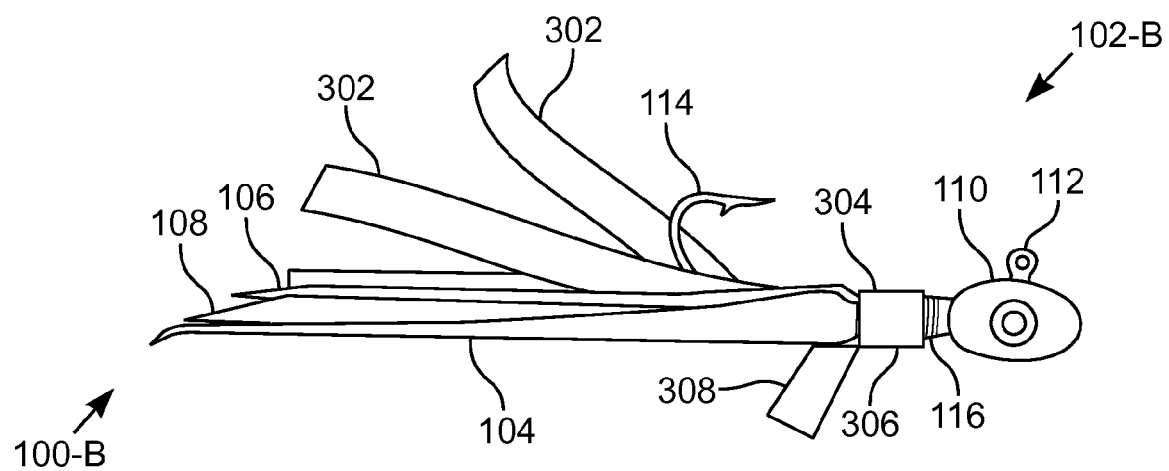
FIG. 3 is a side view of another embodiment of a lure with an embodiment of an iridescent tail with wide ribbons.

FIG. 3 illustrates a side view of another embodiment of a lure 102-B with an embodiment of an iridescent tail 100-B with wide ribbons 302 trailing from the head end 208 of the tail 100-B. The illustrated embodiment includes a plurality of wide ribbons 302 that extend from the inboard end 206 of the layers 104, 106, 108 toward the outboard end 202. The wide ribbons 302 are of different lengths and are formed of an iridescent film. In one such embodiment, the ribbons 302 are thinner in thickness than the outermost layer 104 such that the ribbons 302 are readily displaced and moved by the motion of the lure 100-B in the water. In various embodiments, the ribbons 302 are one or more of an iridescent or colored film.

The embodiment illustrated in FIG. 3 includes a fin assembly 304 that includes at least one fin 308 and a tab 306 that is wrapped around the shank 208 and the iridescent tail 100. In various embodiments, the tab 306 is secured by tape, an adhesive, or a clip. The fins 308 extend downward relative to the lure 102 and, when the lure 102 moves through water, the fins 308 cause the lure 102 to move in an irregular or erratic manner.

Figure 4:
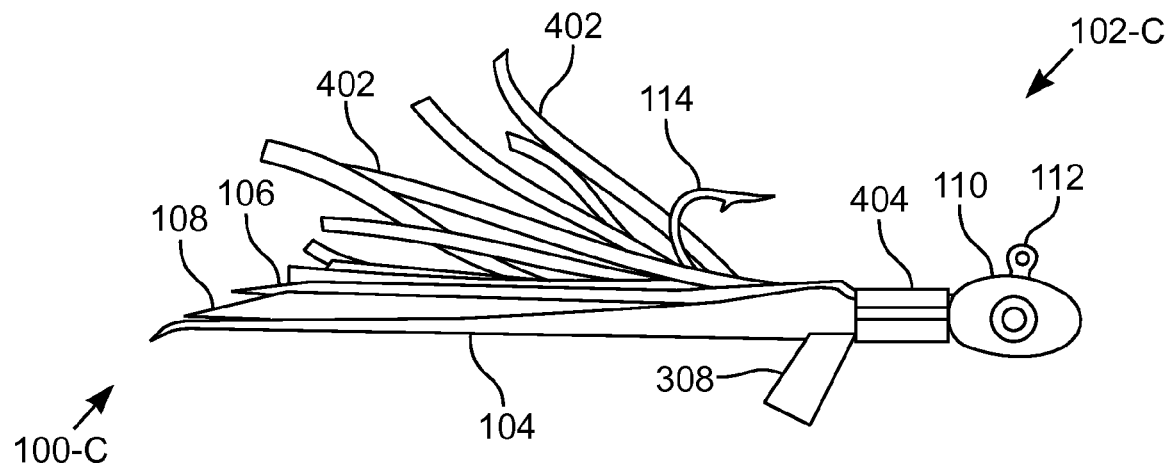
FIG. 4 is a side view of another embodiment of a lure with another embodiment of an iridescent tail with narrow ribbons.

FIG. 4 illustrates a side view of another embodiment of a lure 102-C with another embodiment of an iridescent tail 100-C with narrow ribbons 402 trailing from the head end 208 of the tail 100-C. The illustrated embodiment includes a plurality of narrow ribbons 402 that extend from the inboard end 206 of the layers 104, 106, 108 toward the outboard end 202. The narrow ribbons 402 are of different lengths and are formed of an iridescent film. In one such embodiment, the ribbons 402 are thinner in thickness than the outermost layer 104 such that the ribbons 402 are readily displaced and moved by the motion of the lure 100-C in the water. In various embodiments, the ribbons 402 are one or more of an iridescent or colored film.

The lure 102-C illustrated in FIG. 4 has the iridescent tail 100-C attached to the jig 110 with a connector 404. The iridescent tail 100-C is attached to the shank 208 with a connector 402 that encircles and compresses the tail 100-C to secure it to the shank 208. In one embodiment, the connector 402 is a metal tab that is crimped around the tail 100-C and shank 208. In another such embodiment, the connector 402 is a tab that is formed of a spring steel or other resilient material that encircles the tail 100-C and shank 208.

The embodiment illustrated in FIG. 4 includes at least one fin 308 that extends downward relative to the lure 102. The tab 306 is positioned between the iridescent tail 100-C and the connector 404. The connector 402 secures both the tail 100-C and the tab 306. In another embodiment, the fin assembly 304 is attached to the lure 102 such that the at least one fin 308 is positioned in front of the iridescent tail 100, that is, rather than being dragged through the water, the fin 308 is positioned to dig into the water when the lure 102 is pulled through the water.

Figure 5:
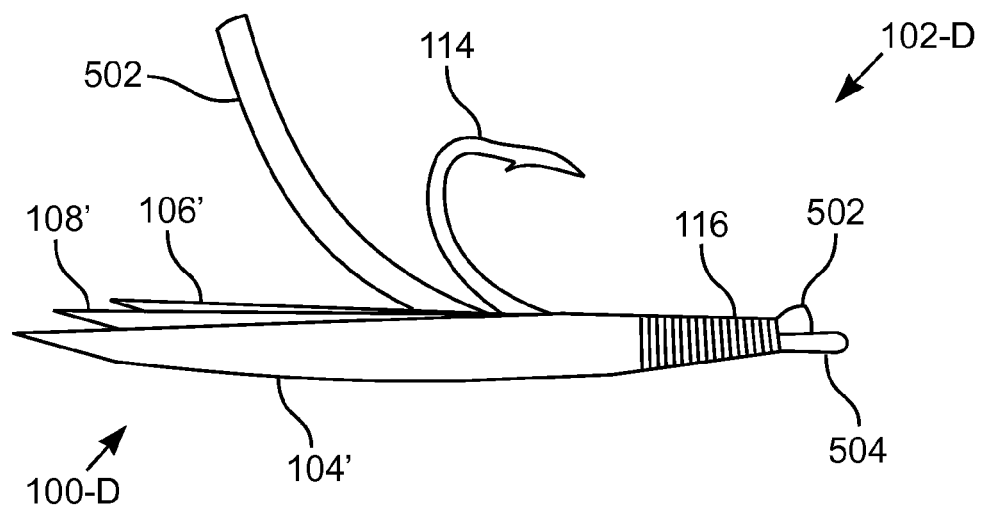
FIG. 5 is a side view of another embodiment of a lure with an embodiment of an iridescent tail with a worm-shaped member.
Figure 6:
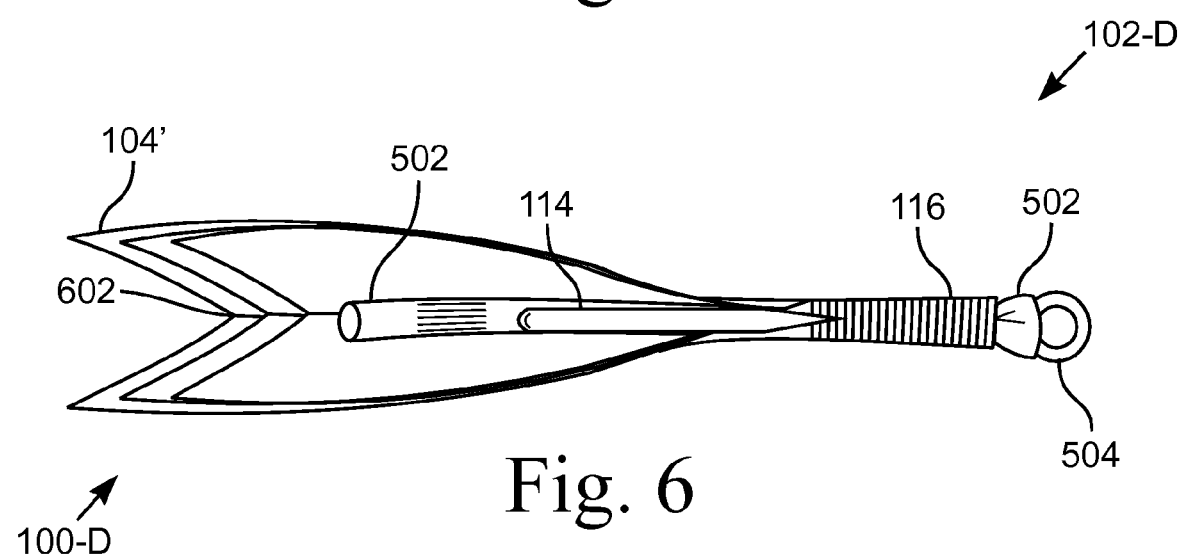
FIG. 6 is a top view of the embodiment of the lure of FIG. 5.

FIG. 5 illustrates a side view of another embodiment of a lure 102-D with an embodiment of an iridescent tail 100-D with a worm-shaped member 502. FIG. 6 illustrates a top view of the embodiment of the lure 102-D of FIG. 5. The illustrated embodiment includes a worm-shaped member 502 extending from the inboard end 206 of the layers 104, 106, 108 toward the outboard end 202. The worm-shaped member 502 is a flexible, elastic material that is readily displaced and moved by the motion of the lure 100-D in the water.

The iridescent tail 100-D includes multiple layers 104', 106', 108' of film with a V-Shaped cut, or notch, 602. The tail 100-D is tied with a line 316 to the shank of hook 114'. The eye 504 of the hook 114' and a small portion of the worm-shaped member 502 extend past the inboard end 206 of the layers 104', 106', 108'.

Figure 7:
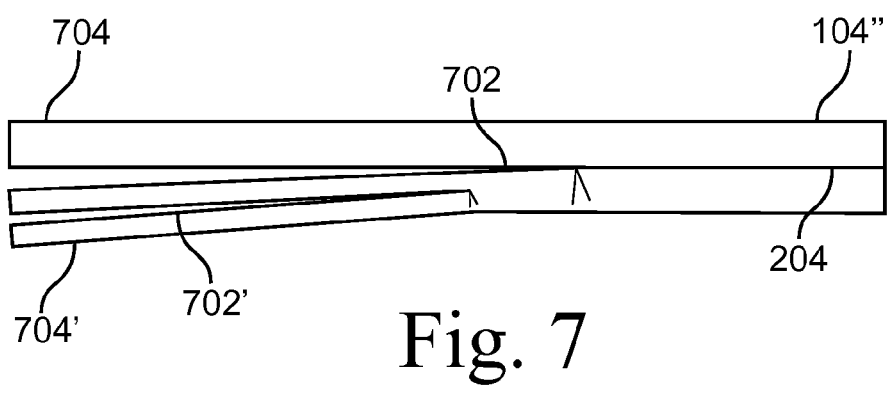
FIG. 7 is another embodiment of a layer showing slits parallel to the longitudinal fold.

FIG. 7 illustrates another embodiment of a layer 104" in which the longitudinal fold 204 extends only partially the length of the layer 104". Although the illustrated layer 104" is the outermost layer 104" of the iridescent tail 100, the illustrated embodiment applies equally to the other layers 106, 108.

The layer 104" includes a first slit 702 that follows the line of the fold 702 toward the outboard end 202 of the layer 104". The slit 702 divides the outboard end 202 of the layer 104" into two strips 704. In the illustrated embodiment, a second slit 702' divides one of the strips 704 into two narrower strips 704'. In other embodiments, the layer 104", 106, 108 includes a fold 204 that extends the full length and one or more slits 702' that are parallel and offset from the fold 204.

An iridescent tail 100 incorporating slits 702 702' in the layers 104", 106, 108 increases the flexibility and resilience of the layers 104", 106, 108. Such an embodiment of an iridescent tail 100 allows the layers 104", 106, 108 to move and be displaced by the water when the lure 102 is submerged. The greater flexibility of the layers due to the slits 702 increases the amount and rate of color change of the iridescent tail 100 as the tail 100 moves through the water.

Those skilled in the art will recognize that the iridescent tail 100 is suitable for attaching to various types of lure bodies without departing from the spirit and scope of the present invention. For example, iridescent tail 100-A, 100-B, 100-C is illustrated attached to a jig 1 10, and the iridescent tail 100-D is illustrated attached to a hook 114'. The iridescent tail 100 is also suitable for attaching to spinners, surface lures, spoon lures, plugs, wobblers, and various types of hooks and/or sinkers.

In the various embodiments, the layers 104, 106, 108 of the iridescent tail 100 are readily adjustable to a shorter length by cutting each layer 104, 106, 108 to the desired length and having the desired end shape 202, 602. For example, the layers 104, 106, 108 can be cut with scissors to a desired, selected length to better entice a particular type of fish.

Figure 8:
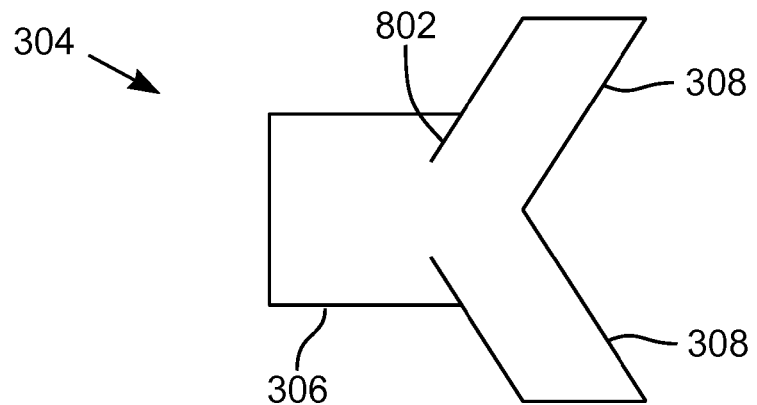
FIG. 8 is a plan view of one embodiment of a fin assembly.

FIG. 8 illustrates a plan view of one embodiment of a fin assembly 304, as it would be when cut from a planar sheet and before being formed into the configuration illustrated in FIGS. 3 and 4. The fin assembly 304 includes a tab 306 and a pair of fins 308. The tab 306 is dimensioned and configured to wrap around, either fully or partially, the shank 208. A portion of the tab 306 is separated from the pair of fins 308 by a pair of slits 802, which allow the tab 306 to assume a substantially cylindrical configuration without causing the pair of fins 308 to assume a similar configuration. The fin assembly 304 is a rigid material that retains its shape and configuration after being bent and/or formed. That is, the tab 306 retains a substantially cylindrical shape and the pair of fins 308 remain bent downwardly after the fin assembly 304 is configured to its final shape.

In one embodiment, the fin assembly 304 is a plastic material that is stiff and rigid, but is sufficiently malleable for the fins 308 to be bent into a downward configuration. In another embodiment, the fin assembly 304 is a thin metal that is stiff and rigid. In such an embodiment, one or more of the fins 308 can be bent into a specific configuration and remain in that configuration when the lure 102 is in the water.

Figure 9:
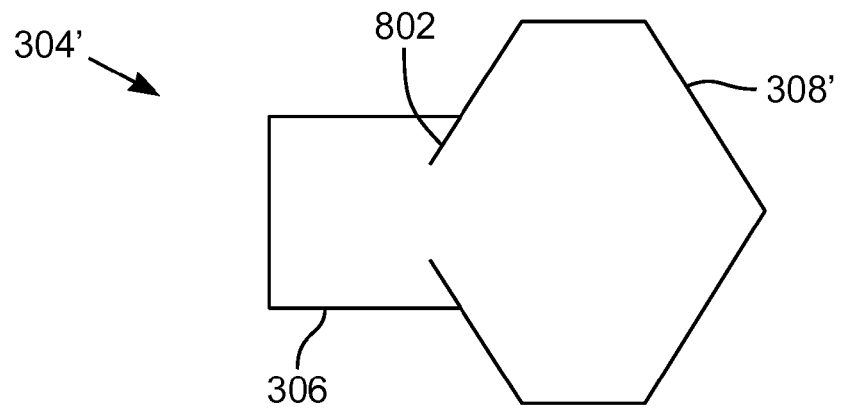
FIG. 9 is a plan view of a second embodiment of a fin assembly.

FIG. 9 illustrates a plan view of a second embodiment of a fin assembly 304'. The illustrated embodiment has a single fin 308' having a polygonal shape. The polygonal shape of the fin 308' provides for a different movement of the lure 102 in the water than with the V-shaped fins 308. In various embodiments, the fin 308' has various shapes, for example, regular and irregular polygons, and oval. The illustrated embodiment is suitable for mounting in the trailing position, as illustrated in FIGS. 3 & 4, or in a leading position where the fin 308' is positioned forward of the tab 306 and/or the iridescent tail 100.

Figure 10:
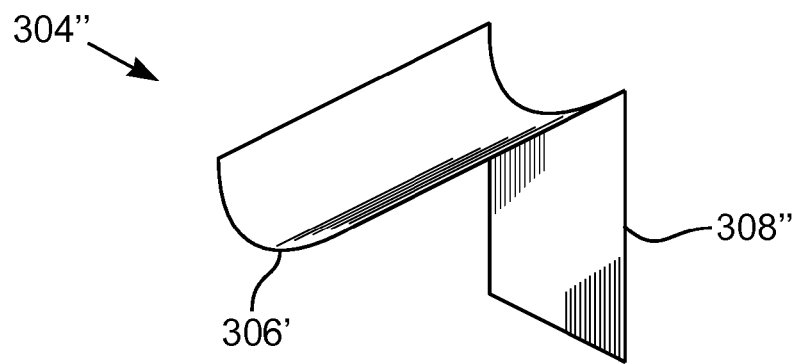
FIG. 10 is a perspective view of a third embodiment of a fin assembly.

FIG. 10 illustrates a perspective view of a third embodiment of a fin assembly 304". In this embodiment, the single fin 308" has a rectangular shape that extends downward away from the shank 208 when the fin assembly 304" is attached to the lure 102. The tab 306' has a half-cylindrical shape that is suitable for being captured by the connector 404 as illustrated in FIG. 4.

The iridescent tail 100 includes various functions. The function of creating instability of the lure 102 is implemented, in one embodiment, by the shape and configuration of the layers 104, 106, 108 as illustrated in FIGS. 1-7. In other embodiments, the function of creating instability of the lure 102 is further aided by the ribbons 302, 402 illustrated in FIGS. 3, 4, and/or the worm-shaped member 502 illustrated in FIGS. 5, 6. In still other embodiments, the function of creating instability of the lure 102 is implemented by the various fin assemblies 304 that are attached at the head of the iridescent tail 100.

The function of presenting changing colors is implemented, in one embodiment, by layers 104, 106, 108 being an iridescent film. In other embodiments, the function of presenting changing colors is further aided by the ribbons 302, 402 being an iridescent film. In other embodiments, the function of presenting changing colors is implemented by a thin crumpled and/or textured iridescent layer 108 positioned between translucent layers 104, 106.

The function of presenting an overall color scheme in the iridescent tail 100 is implemented, in one embodiment, by the middle layer 108 being a translucent film having a color, such as yellow or blue. In another embodiment, the function of presenting an overall color scheme in the iridescent tail 100 is implemented by one or more of the iridescent layers 104, 106 having a color.

From the foregoing description, it will be recognized by those skilled in the art that a fishing lure 102 has been disclosed. The fishing lure 102 has an iridescent tail 100 that moves through the water and presents multiple changing colors. The changing colors, aided by the movement of the iridescent tail 100 through the water, attracts fish and causes them to strike at the lure 102. The iridescent tail 100 is attached axially and extending away from a lead line. The lead line is a line that is attached to the lure 102.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for attracting fish, said apparatus comprising:
   a first sheet of iridescent film, said first sheet being translucent, said first sheet being elongated with a longitudinal fold, said first sheet having a first end, a second end opposite the first end, and a first sheet length therebetween, said longitudinal fold of said first sheet extending at least half of the first sheet length;
   a second sheet of iridescent film, said second sheet being translucent, said second sheet being elongated with a longitudinal fold, said second sheet dimensioned and configured to be positioned adjacent to said first sheet, said second sheet having a first end, a second end, and a second sheet length therebetween, said longitudinal fold of said second sheet extending at least half of the second sheet length, said length of said first sheet being different than said length of said second sheet, said first end of said first sheet dimensioned and configured to join to said second sheet and further dimensioned and configured to connect axially and extending away from a lead line, and wherein said second ends of said first sheet and said second sheet are free and unattached to each other.

2. The apparatus of claim 1 further including a third sheet of film positioned between said first sheet and said second sheet, said third sheet having a first end dimensioned and configured to join to said first end of said second sheet.

3. The apparatus of claim 1 further including a fish hook with a shank, a portion of said shank being received by said longitudinal fold in said first sheet.

4. The apparatus of claim 1 further including a plurality of ribbons each having a first end dimensioned and configured to be secured adjacent said first end of said first sheet.

5. The apparatus of claim 1 further including a worm-shaped member having a first end dimensioned and configured to be secured adjacent said first end of said first sheet.

6. The apparatus of claim 1 wherein at least one of said first sheet and said second sheet includes at least one slit in said second end opposite said first end, said at least one slit being parallel to said longitudinal fold.

7. An apparatus for attracting fish, said apparatus comprising:
   a first sheet of translucent film, said first sheet being elongated with a longitudinal fold, said first sheet having a first end, a second end opposite said first end, and a first sheet length therebetween, said longitudinal fold of said first sheet extending at least half of the first sheet length;
   a second sheet of translucent film, said second sheet being elongated with a longitudinal fold, said second sheet adjacent to said first sheet, said second sheet having a first end, a second end opposite said first end, and a second sheet length therebetween, said longitudinal fold of said second sheet extending at least half of the second sheet length, at least one of said first sheet and said second sheet being an iridescent film; and
   a fish hook having a shank, a portion of said shank received by said longitudinal fold in said first sheet, said first end of said first sheet and said second sheet secured to said shank of said fish hook, thereby attaching said first sheet to said second sheet adjacent said shank, and wherein said second ends of said first sheet and said second sheet are free and unattached to each other.

8. The apparatus of claim 7 wherein said iridescent film is a crumpled sheet with a plurality of folds and creases.

9. The apparatus of claim 7 further including a third sheet of film positioned between said first sheet and said second sheet, said third sheet being translucent.

10. The apparatus of claim 7 further including a plurality of ribbons each having a first end secured adjacent to said shank of said fish hook adjacent said first end of said first sheet.

11. The apparatus of claim 7 further including a worm-shaped member having a first end secured adjacent to said shank of said fish hook adjacent said first end of said first sheet.

12. The apparatus of claim 7 wherein at least one of said first sheet and said second sheet includes at least one slit in said second end opposite said first end, said at least one slit being parallel to said longitudinal fold.

13. An apparatus for attracting fish, said apparatus comprising:
   a first sheet of iridescent film, said first sheet being translucent, said first sheet being elongated with a longitudinal fold, said first sheet having a first end, a second end opposite said first end, and a first sheet length therebetween;
   a second sheet of iridescent film, said second sheet being translucent, said second sheet being elongated with a longitudinal fold, said second sheet having a first end, a second end opposite said first end, and a second sheet length therebetween;
   a third sheet of film positioned between said first sheet and said second sheet, said third sheet having a first end, a second end opposite said first end, and a third sheet length therebetween; and
   a fish hook having a shank, a portion of said shank received by said longitudinal fold in said first sheet, said first end of said first sheet, said first end of said second sheet, and said first end of said third sheet secured to said shank of said fish hook, thereby attaching said first sheet, said second sheet, and said third sheet adjacent said shank, and wherein said second ends of said first sheet, said second sheet, and said third sheet are free and unattached to each other.

14. The apparatus of claim 13 further including a plurality of ribbons each having a first end secured to said shank of said fish hook adjacent said first end of said first sheet.

15. The apparatus of claim 13 further including a worm-shaped member having a first end secured to said shank of said fish hook adjacent said first end of said first sheet.

16. The apparatus of claim 13 wherein said first sheet length of said first sheet is less than said third sheet length of said third sheet, and said third sheet length of said third sheet is less than said second sheet length of said second sheet.

17. The apparatus of claim 13 wherein each said second ends of said first, second, and third sheets have one of a pointed shape and a V-shaped notch.

18. The apparatus of claim 13 wherein at least one of said first sheet and said second sheet includes at least one slit in said second end opposite said first end, said at least one slit being parallel to said longitudinal fold.

19. The apparatus of claim 13 wherein said third sheet is translucent and has a color.

20. The apparatus of claim 13 further including at least one fin extending away from said first end of said second sheet.

* * * * *